(12) United States Patent
Im

(10) Patent No.: US 9,499,058 B2
(45) Date of Patent: Nov. 22, 2016

(54) ELECTRIC CHARGING APPARATUS AND OPERATION METHOD THEREOF

(71) Applicant: LSIS CO., LTD., Anyang-si, Gyeonggi-do (KR)

(72) Inventor: Chang Jun Im, Asan-si (KR)

(73) Assignee: LSIS CO., LTD., Anyang-si (KR)

( * ) Notice: Subject to any disclaimer, the term of this patent is extended or adjusted under 35 U.S.C. 154(b) by 216 days.

(21) Appl. No.: 14/209,429

(22) Filed: Mar. 13, 2014

(65) Prior Publication Data

US 2014/0285136 A1 Sep. 25, 2014

(30) Foreign Application Priority Data

Mar. 19, 2013 (KR) .......................... 10-2013-0029295

(51) Int. Cl.
*B60L 11/18* (2006.01)
*B60L 3/00* (2006.01)
(Continued)

(52) U.S. Cl.
CPC .......... *B60L 11/1809* (2013.01); *B60L 3/0069* (2013.01); *B60L 3/04* (2013.01); *B60L 11/1816* (2013.01); *B60L 11/1838* (2013.01); *H02H 11/001* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01)

(58) Field of Classification Search
CPC .................................................. B60L 11/1809
USPC ........................................................ 320/107
See application file for complete search history.

(56) References Cited

U.S. PATENT DOCUMENTS 3,996,496 A * 12/1976 Volk, Jr. ............... H02H 11/001
324/510
4,410,925 A * 10/1983 Tucker ..................... H02H 3/17
361/42

(Continued)

FOREIGN PATENT DOCUMENTS

GB 2225184 5/1990
GB 2235982 3/1991

(Continued)

OTHER PUBLICATIONS

The State Intellectual Property Office of the People's Republic of China Application Serial No. 201410103408.1, Office Action dated Sep. 6, 2015, 7 pages.

(Continued)

*Primary Examiner* — Samuel Berhanu
*Assistant Examiner* — Tessema Kebede
(74) *Attorney, Agent, or Firm* — Lee Hong Degerman Kang & Waimey

(57) ABSTRACT

An electric charging apparatus is provided. The electric charging apparatus includes a ground determination signal generating unit measuring a current signal or voltage signal that is generated from power applied from a power supply unit, the ground determination signal generating unit generating a signal for determining whether the power supply unit is normally grounded on the basis of the current or voltage signal, a power control unit generating a power control signal on the basis of a ground determination detecting signal generated from the ground determination signal generating unit, and a power cutoff unit cutting power supply to a target device to be charged on the basis of the power control signal.

5 Claims, 4 Drawing Sheets

(51) Int. Cl.
*B60L 3/04* (2006.01)
*H02H 11/00* (2006.01)

(56) References Cited

U.S. PATENT DOCUMENTS

| | | | | |
|---|---|---|---|---|
| 4,580,186 | A | * | 4/1986 | Parker ............... H02H 3/165 361/42 |
| 8,203,308 | B1 | * | 6/2012 | Guo ............... B60L 3/0069 320/119 |
| 2009/0091868 | A1 | * | 4/2009 | Trenchs ............... B60L 3/0046 361/42 |
| 2011/0013322 | A1 | * | 1/2011 | Gale ............... B60L 3/0069 361/42 |
| 2011/0216451 | A1 | * | 9/2011 | Haines ............... B60L 3/0069 361/42 |

FOREIGN PATENT DOCUMENTS

| | | | |
|---|---|---|---|
| JP | 53076879 | | 6/1978 |
| JP | 2010-124578 | | 6/2010 |
| JP | 2010124578 | * | 6/2010 |

OTHER PUBLICATIONS

European Patent Office Application Serial No. 14159978.7, Search Report dated Oct. 22, 2015, 7 pages.
Japan Patent Office Application Serial No. 2014-056206, Office Action dated Jan. 29, 2015, 3 pages.

* cited by examiner

ELECTRIC CHARGING APPARATUS AND OPERATION METHOD THEREOF

CROSS-REFERENCE TO RELATED APPLICATIONS

Pursuant to 35 U.S.C. §119(a), this application claims the benefit of earlier filing date and right of priority to Korean Application No. 10-2013-0029295, filed on Mar. 19, 2013, the contents of which is incorporated by reference herein in its entirety.

BACKGROUND

Embodiments relate to an electric charging apparatus, and particularly, to an electric charging apparatus that is capable of determining whether a power supply device is grounded.

Air pollution in big cities is getting worse. Gas emission from vehicles may be one of the main causes of the air pollution. In this situation, studies on commercialization of so-called electric vehicles using electricity which is non-polluting energy as a power source are actively being progressed. The electric vehicles receive electric energy from the outside to charge batteries thereof and then obtain driving power that is mechanical energy through motors coupled to wheels by using voltages charged in the batteries. That is, since the electric vehicles need to drive the motors by using the voltages charged in the batteries, high capacity chargeable batteries are being used. Thus, there are electric charging apparatuses for charging these high capacity chargeable batteries.

The electric charging apparatuses are divided into high-speed battery chargers and idle-speed battery chargers.

The high-speed battery chargers are installed at places such as gas stations where a user stops for quickly charging an electric vehicle during the traveling. Here, it takes about 20 minutes to charge the electric vehicle. On the other hand, the idle-speed battery chargers are installed at places such as parking lots, shopping centers where it is expected that electric vehicles are parked for a long time. Here, it takes about five hours to charge the electric vehicles.

Such an electric charging apparatus has a risk of electric shock because it uses electricity. Particularly, when a power supply unit is not normally grounded, the user using the electric charging apparatus may be get shocked, and also the electric charging apparatus may be broken. However, the electric charging apparatus according to related art has a limitation that it is not determined whether the power supply device is grounded.

SUMMARY

Embodiments provide an electric charging apparatus that is capable of determining whether a power supply unit is grounded.

Embodiments also provide an electric charging apparatus including: a ground determination signal generating unit measuring a current signal or voltage signal that is generated from power applied from a power supply unit, the ground determination signal generating unit generating a signal for determining whether the power supply unit is normally grounded on the basis of the current or voltage signal; a power control unit generating a power control signal on the basis of a ground determination detecting signal generated from the ground determination signal generating unit; and a power cutoff unit cutting power supply to a target device to be charged on the basis of the power control signal.

The details of one or more embodiments are set forth in the accompanying drawings and the description below. Other features will be apparent from the description and drawings, and from the claims.

DETAILED DESCRIPTION OF THE EMBODIMENTS

Terms used in the following description and scopes of claims are not limited to terms that have been in dictionaries, and are used only for explain specific exemplary embodiments while not limiting the present invention.

Therefore, embodiments and drawings described herein are simply exemplary and not exhaustive, and it will be understood that various modifications and equivalents may be made to take the place of the embodiments.

Figure 1:
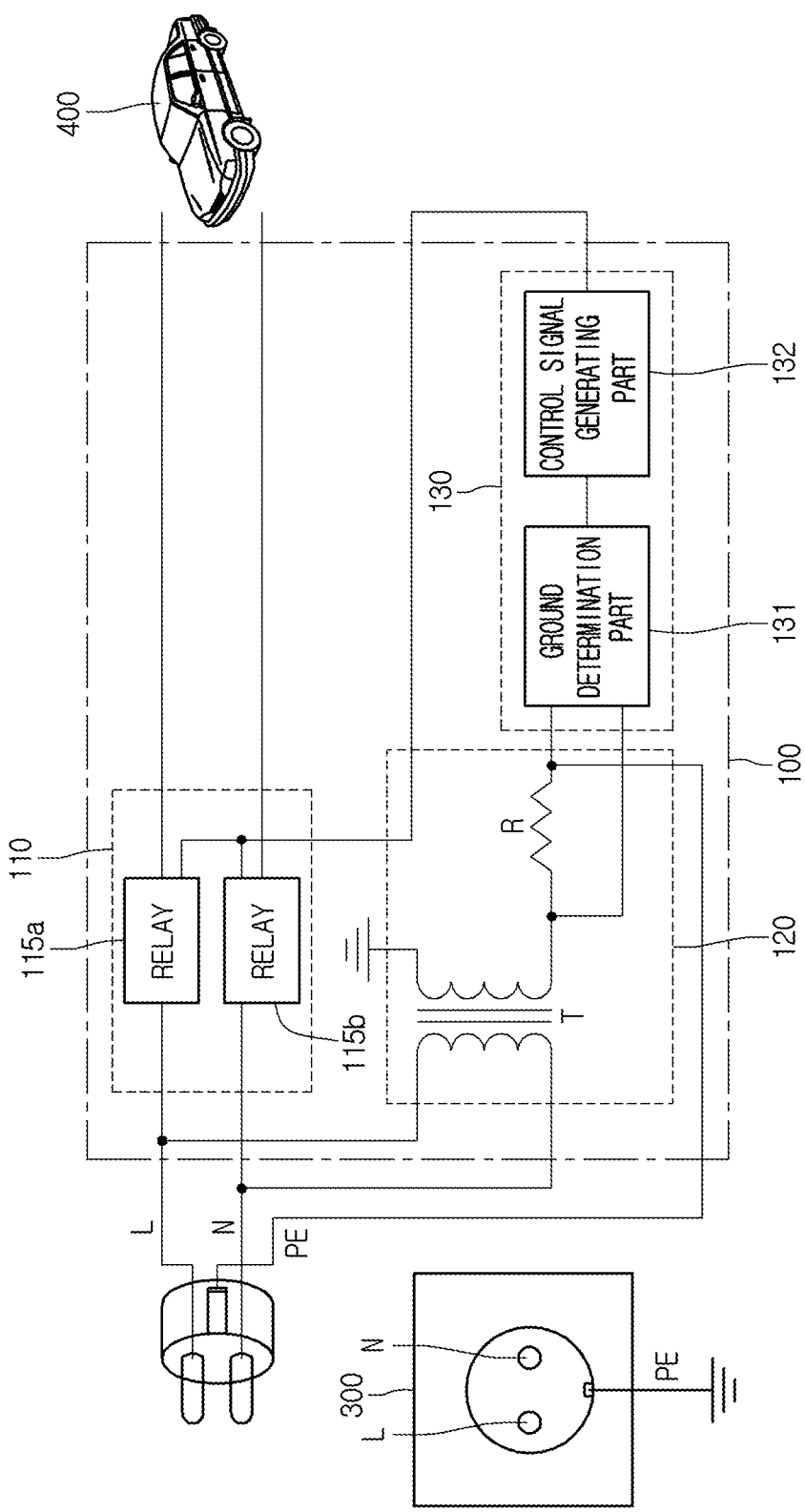
FIG. 1 is a block diagram of an electric charging apparatus for charging a vehicle according to an embodiment.

FIG. 1 is a block diagram of an electric charging apparatus for charging a vehicle according to an embodiment.

The electric charging apparatus according to an embodiment will be described with reference to FIG. 1.

The electric charging apparatus 100 according to an embodiment may be constituted by a power cutoff unit 110, a ground determination signal generating unit 120, and a power control unit 130.

The electric charging apparatus 100 may receive power from the power supply unit 300 to charge a target device 400 to be charged (hereinafter, referred to as a "target device"). Here, the supplied power may be current or voltage of about 60 Hz which is usually used in homes or factories. Although the target device 400 is exemplified as an electric vehicle in the current embodiment, the present disclosure is not limited thereto. For example, the electric vehicles may be replaced with various devices which are electrically chargeable.

According to an embodiment, the power cutoff unit 110 may include a plurality of relays 115. According to an embodiment, the power cutoff unit 110 may include two relays. One relay 115a of the two relays 115 has one end connected to a line L of the power supply unit 300 and the other end connected to a control signal generating part 132. The other relay 115b has one end connected to a line N and the other end connected to the control signal generating part 132.

The power cutoff unit 110 according to an embodiment may cut the power supplied to the target device 400 when the power supply unit 300 is poor in ground state. That is, the power cutoff unit 110 according to an embodiment may turn the plurality of relays 115 off to cut the power supplied to the target device 400 when the power supply unit 300 is faulty in ground state. The power cutoff unit 110 according to an embodiment may turn the relay on/off on the basis of a control signal applied from the control signal generating part 150.

The power cutoff unit 110 according to an embodiment may turn the relay 115 on when the power cutoff unit 110 receives a power supply control signal from the control signal generating part 150.

The power cutoff unit 110 according to an embodiment may turn the relay 115 off when the power cutoff unit 110 receives the power supply control signal from the control signal generating part 150.

The ground determination signal generating unit 120 according to an embodiment may include a transformer T and a resistor R1.

The transformer T has a primary coil of which one end is connected to the line L of the power supply unit 300 and the other end is connected a line PE of the power supply apparatus.

The transformer T has a secondary coil of which one end is grounded and the other end is connected to one end of the resistor R1 and ground determination part 131.

The resistor R1 has the other end connected to the ground determination part 131.

The ground determination signal generating unit 120 generates a ground determination signal that is capable of determining whether the power supply unit 300 is normally grounded. The ground determination signal generating unit 120 generates a current signal or voltage signal that is capable of determining whether the power supply unit 300 is normally grounded.

The transformer T according to an embodiment may divide the power into power for a common line and power for a sensing line.

The transformer T according to an embodiment may transform the voltages applied from the two lines L and N of the power supply unit 300.

In the resistor R1 according to an embodiment, a current signal flows, and a voltage signal is applied on the basis of a voltage transformed by the transformer T. The ground determination signal according to an embodiment may include the current signal flowing in the resistor R1 or the voltage signal applied to the resistor R1.

The power control unit 130 according to an embodiment may include the ground determination part 131 and the control signal generating part 132. However, the components illustrated in FIG. 1 are not essential, for example, the power control unit 130 having the greater or less number of components may be realized according to an embodiment.

The power control unit 130 determines whether the power supply unit 300 is normally grounded on the basis of the ground determination signal that is generated from the ground determination signal generating unit 120. The power control unit 130 according to an embodiment determines whether the power supply unit 300 is normally grounded on the basis of the current signal or voltage signal of the ground determination signal generating unit 120. The power control unit 130 according to an embodiment may determine whether the power supply unit 300 is normally grounded on the basis of the current signal flowing in the resistor R1 or the voltage signal applied to the resistor R1. The ground determination part 131 according to an embodiment may determine whether the power supply unit 300 is normally grounded on the basis of the current signal or the voltage signal. The ground determination part 131 may measure a resistance value R2 of a resistor connected to the line PE of the power supply unit 300 on the basis of the current signal or the voltage signal. Here, if the measured resistance value R2 is above a specific range, it is determined that the power supply unit 300 is not normally grounded. According to an embodiment, when the power supply unit 300 has a resistance value R2 greater than about 100 'Ω, it is determined that the power supply unit 300 is not normally grounded. The ground determination part 131 determines whether the power supply unit is normally grounded.

The control signal generating part 132 may output the power control signal on the basis of the result that is determined by the ground determination part 131. The control signal generating part 132 may generate the power supply control signal when the power supply unit 300 is normally grounded and may generate the power cutoff control signal when the power supply unit 300 is not normally grounded, in response to the determined result.

Hereinafter, an operation of the electric charging apparatus 100 according to an embodiment will be described in detail with reference to FIGS. 2 to 4.

Figure 2:
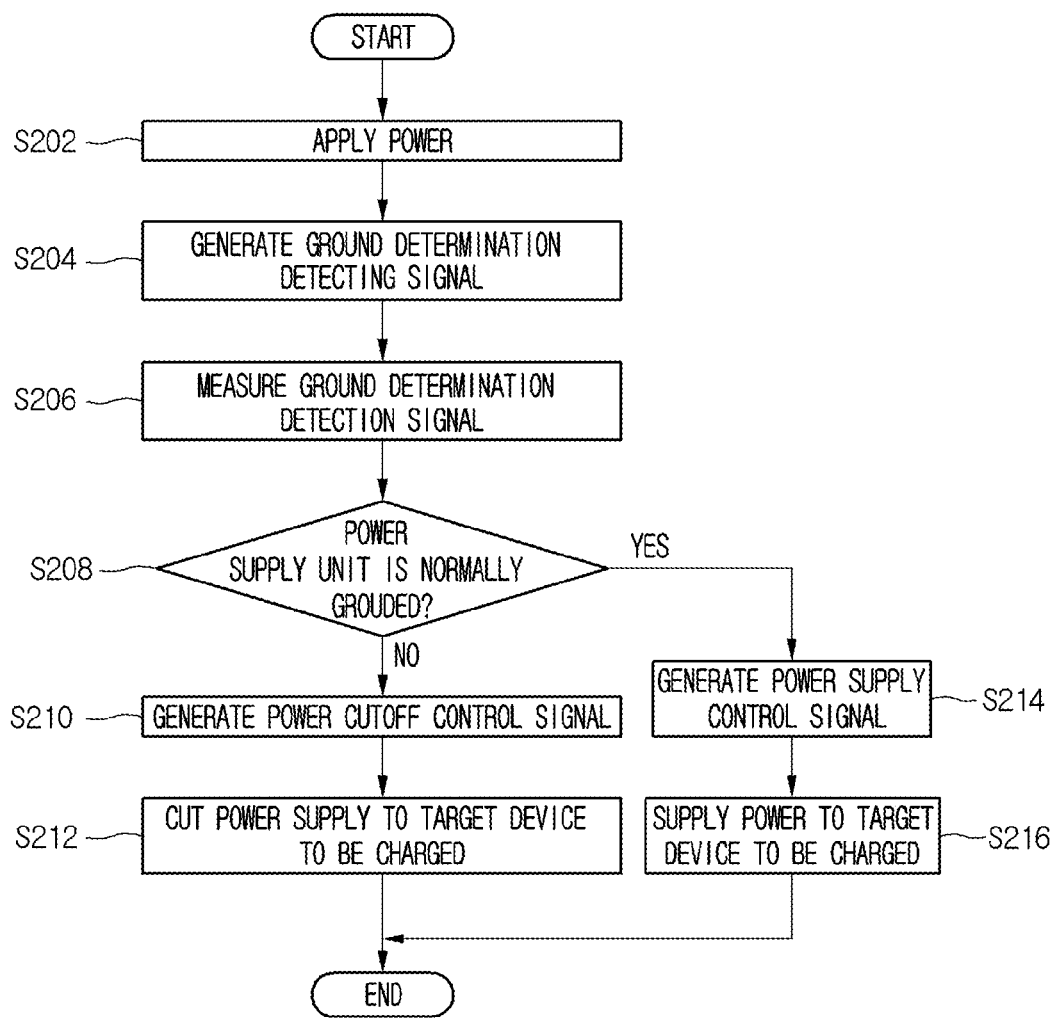
FIG. 2 is a flowchart for explaining an operation of the electric charging apparatus according to an embodiment.

FIG. 2 is a flowchart for explaining an operation of the electric charging apparatus according to an embodiment.

Referring to FIG. 2, in operation S202, the electric charging apparatus 100 according to an embodiment receives power from the power supply unit 300.

In operation S204, the ground determination signal generating unit 120 of the electric charging apparatus 100 may generate a ground determination signal on the basis of the supplied power.

The transformer T of the ground determination signal generating unit 120 may transform voltages applied to the line L and N of the power supply unit 300. A current signal may flow in the resistor R1 on the basis of the voltage transformed in the transformer T. Here, the voltage signal may be applied to the resistor R1. The ground determination signal may include a current signal flowing in the resistor R1 or a voltage signal applied to the resistor R1.

In operation S206, the power control unit 300 of the electric charging apparatus 100 may measure the ground determination signal.

The ground determination part 131 of the power control unit 130 may measure the current signal flowing in the resistor R1 or the voltage signal applied to the resistor R1.

In operation S208, the power control unit 130 may determine whether the power supply unit 300 is normally grounded on the basis of the ground determination signal.

The ground determination part 131 may determine whether the power supply unit 300 is normally grounded on the basis of the current signal flowing in the resistor R1 or the voltage signal applied to the resistor R1. The ground determination part 131 may measure a resistance value of a ground line of the power supply unit 300 on the basis of the current signal flowing in the resistor R1 or the voltage signal applied to the resistor R1.

Figure 3:
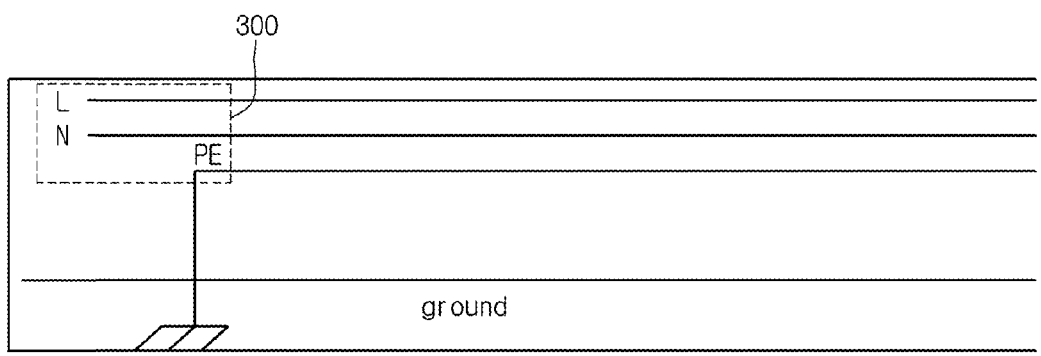
FIG. 3 is a view illustrating a state where a power supply unit is ideally grounded according to an embodiment.

FIG. 3 is a view illustrating a state where a power supply unit is ideally grounded according to an embodiment.

Figure 4:
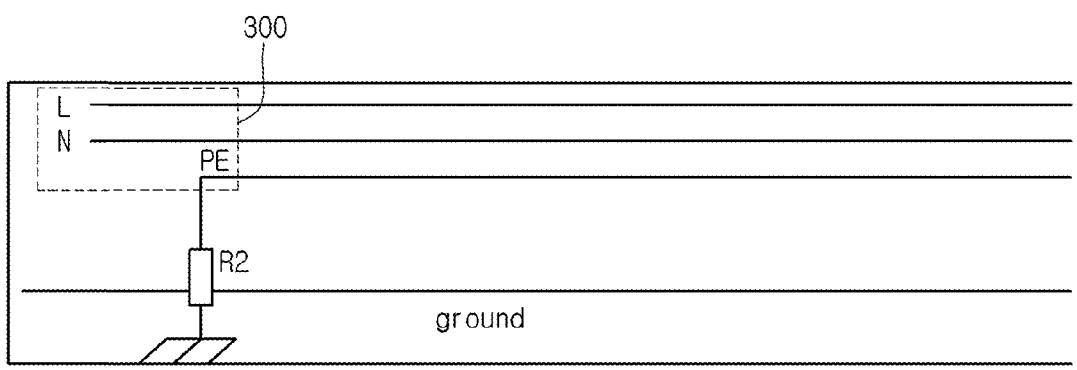
FIG. 4 is a view illustrating a state where a power supply unit is actually grounded according to an embodiment.

Referring to FIG. 4, an actual power supply unit 300 has a resistance value R2 of the ground line PE.

FIG. 2 will be described again.

The ground determination part 131 according to an embodiment may determine that the power supply unit 300 is not normally grounded when the current signal flowing in the resistor R1 or the voltage signal applied to the resistor R1 exceeds a normal range.

On the other hand, the ground determination part 131 may determine that the power supply unit 300 is normally grounded when the current signal flowing in the resistor R1 or the voltage signal applied to the resistor R1 is within the normal range.

The ground determination part 131 may determine that the power supply unit 300 is normally grounded when the magnitude of the resistance value R2 calculated on the basis of the current signal flowing in the resistor R1 or the voltage signal applied to the resistor R1 is within the normal range.

A range of the current signal flowing in the resistor R1, the voltage signal applied to the resistor R1, or the resistance value R2 may be set by a user input. Alternatively, the range may be previously stored in a storage unit (not shown).

In operation S210, if the power supply unit 300 is not normally grounded, the power control unit 130 may generate the power cutoff control signal.

The control signal generating part 132 may generate the power cutoff control signal if the power supply unit 300 is not normally grounded. The power cutoff control signal may be a control signal with respect to a turn-off command of the relay.

In operation S212, the power cutoff unit 110 may receive the power cutoff control signal to cut the power applied to the target device 400. That is, the power cutoff unit 110 may turn the relay 115 off to cut the power supplied to the target device 400.

In operation S214, if the power supply unit 300 is normally grounded, the power control unit 130 may generate the power supply control signal. That is, when the power supply unit 300 is normally grounded, the power control unit 130 may generate the power supply control signal which is capable of turning the relay on.

In operation S216, the power cutoff unit 110 may receive the power supply control signal to supply the power applied to the target device 400. That is, the power cutoff unit 110 may turn the relay 115 on to supply the power to the target device 400.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. Therefore, contents with respect to various variations and modifications will be construed as being included in the scope of the present disclosure.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electric charging apparatus comprising:
   a ground determination signal generating unit measuring a current signal or voltage signal that is generated from power applied from a power supply unit, the ground determination signal generating unit generating a signal for determining whether the power supply unit is normally grounded on the basis of the current or voltage signal;
   a power control unit generating a power control signal on the basis of a ground determination detecting signal generated from the ground determination signal generating unit; and
   a power cutoff unit cutting power supply to a target device to be charged on the basis of the power control signal;
   wherein the ground determination signal generating unit comprises a transformer transforming the generated voltage on the basis of the power applied from the power supply unit and a resistor,
   wherein the ground determination signal generating unit generates the ground determination detecting signal on the basis of the current signal flowing in the resistor or the voltage signal applied to the resistor,
   wherein the transformer has a primary coil of which one end is connected to a first line L of the power supply unit, and the other end is connected to a second line PE of the power supply unit and a secondary coil of which one end is grounded, and the other end is connected to one end of the resistor and the ground determination part,
   wherein the power cutoff unit comprises a plurality of relays, and
   the power to be supplied to the target device to be charged is controlled by on/off operations of the plurality of relays.

2. The electric charging apparatus according to claim 1, wherein the power control unit comprises:
   a ground determination part measuring the current signal or the voltage signal, the ground determination part determining whether the power supply unit is normally grounded on the basis of the measured current signal or voltage signal; and
   a control signal generating part generating a power control signal on the basis of the result determined by the ground determination part.

3. The electric charging apparatus according to claim 2, wherein the ground determination part calculates a resistance value of the power supply unit on the basis of the current signal or voltage signal and determines whether the power supply unit is normally grounded on the basis of the resistance value.

4. The electric charging apparatus according to claim 2, wherein the control signal generating part generates a power supply control signal when the power supply unit is normally grounded and generates a power cutoff control signal when the power supply unit is not normally grounded.

5. The electric charging apparatus according to claim 4, wherein a first relay of the plurality of relays has one end connected to the first line L of the power supply unit and the other end connected to the control signal generating part, and a second relay has one end connected to a third line N of the power supply unit and the other end connected to the control signal generating part.

* * * * *